United States Patent [19]
Branstetter

[11] 3,805,337
[45] Apr. 23, 1974

[54] SPRING WIRE HOSE CLAMP
[75] Inventor: Joseph C. Branstetter, Colma, Calif.
[73] Assignee: Raymond Lee Organization, Inc.,
New York, N.Y.; a part interest
[22] Filed: Apr. 23, 1973
[21] Appl. No.: 353,757

[52] U.S. Cl. .................................................. 24/27
[51] Int. Cl. .......................................... B65d 63/10
[58] Field of Search..... 24/27, 256, 255 C, 261 AC,
24/257 R

[56] References Cited
UNITED STATES PATENTS
2,957,217  10/1960  Mortorelli.............................. 24/27
3,064,231  11/1962  Satrum............................ 24/27 UX

*Primary Examiner*—Donald A. Griffin
*Attorney, Agent, or Firm*—Howard I. Podell

[57] ABSTRACT

A self-tightening spring wire hose clamp of generally circular shape, with each of the free ends of the hose clamp bent at right angles to the plane of the clamp. The bent half sections of the hose clamp enable gripping the bent free ends of the hose clamp by a pliers or other tools, with the plane of the gripping tool being either in the plane of the hose clamp or with the plane of the tool at an angle to the plane of the hose clamp.

2 Claims, 3 Drawing Figures

SPRING WIRE HOSE CLAMP

SUMMARY OF THE INVENTION

This invention relates to an improved wire hose clamp in which the free ends of the clamp are bent at right angles to the plane of the hose clamp.

The advantage of this invention is that the free ends of the clamp may be gripped by a pliers or other tool in inserting or removing said clamp, with the tool held at any convenient angle to the plane of the hose clamps. Hose clamps are widely used to fasten tubing in close quarters and this invention permits the mechanic to readily install or remove such clamps with a minimum of accessibility to the free ends of the clamp. The clamp is formed in the conventional circular shape of a spring wire clamp with each of the free ends of the clamp being bent at right angles to the plane of the clamp. In the preferred embodiment each of the free ends of the clamp are bent in the direction towards the other end of the clamp so that each free end of the clamp extends over the plane of the mid-section of the clamp.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
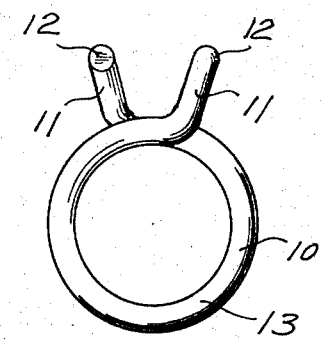
FIG. 1 is an elevation view of the improved hose clamp.
Figure 2:
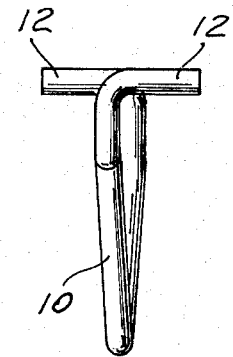
FIG. 2 is a side view of the improved hose clamp.
Figure 3:
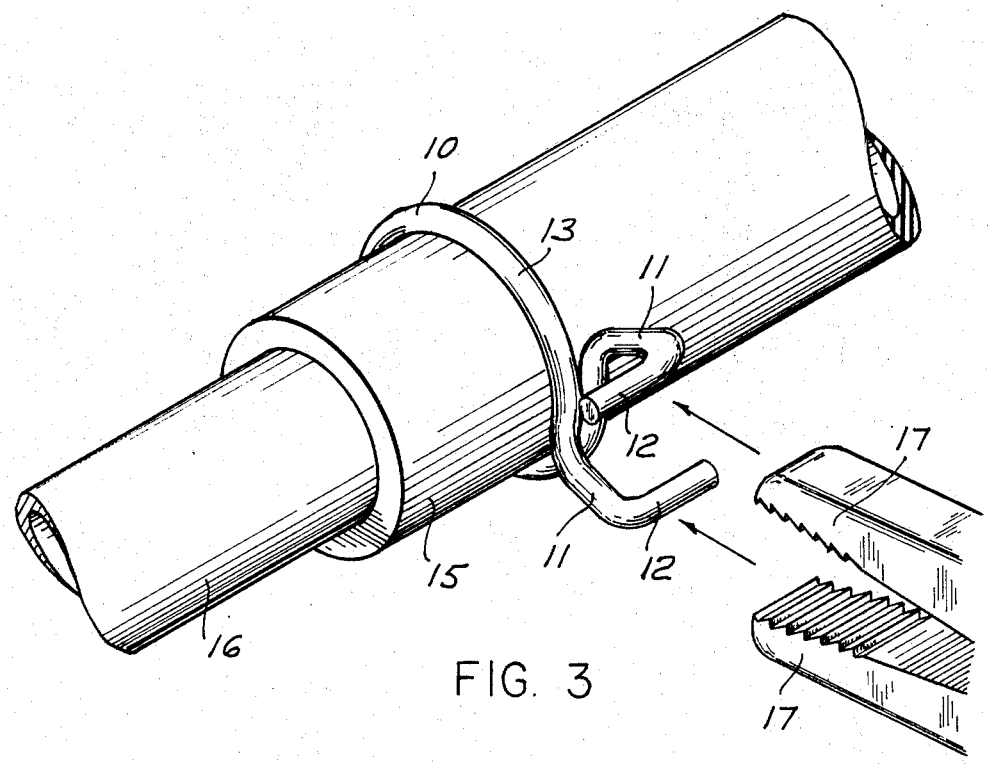
FIG. 3 is a perspective view of the installed hose clamp about to be opened by the jaws of a pliers.

Turning now descriptively to the drawings, in which similar reference characters denote similar elements throughout the several views as shown in FIG. 1-3, the clamp 10 is formed of a spring wire of circular cross-section in the general shape of a circle, the internal diameter of which is less than the outer diameter of the hose 15 which is to be clamped to a pipe 16. The circular section 13 of the clamp terminates at each end in a neck 11 which is bent so as to lie in radial orientation away from a center of the circle formed by the body 13 of clamp 10. Each free end tab 12 of neck 11 is bent at right angles to neck 11 so that the axis of the free end tab 12 lies perpendicular to the general plane in which the circular body section 13 of the clamp is oriented, with each tab end 12 bent so as to project over the circular body section 13 of the spring clamp 10.

As shown in FIG. 3, the orientation of the tab end 12 permits the jaws 17 of a plier to grasp the two tab ends 12 for the purpose of loosening the clamp 10 when the plane of the jaws 17 of the pliers are in the general plane of the clamp 10, with the axis of the pliers at right angles to the axis of tubing 16. The pliers may also be utilized to open the clamp in the conventional fashion with the plane of the pliers being parallel to the axis of the tubing that is being fastened by the clamp. It is to be noted that when the plane of the pliers is parallel to the general plane of the clamp, considerably less access room is required for the operation since the handle end of the pliers and the hands of the mechanic grasping the pliers are furthest away from the tubing 15 which is being clamped to the pipe 16.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters Patent of the United States is:

1. An improved spring wire clamp of generally circular shape for the clamping of pipes and tubing, with the free ends of the clamp shaped so that each of the free ends is formed into a tab that may be readily gripped by the jaws of a pliers, comprising a clamp formed by a section of spring wire which is shaped in the general form of an open circle with the shank of each free end of the clamp bent so as to lie in a radial orientation to the circle of the clamp and with the end of each shank bent at right angles to the axis of the shank so that the axis of the free end of the shank lies perpendicular to the general plane of the circle of the clamp.

2. The combination as recited in claim 1, in which each free end of the shank is bent from the shank section so as to project over the plane of the circle formed by the clamp.

* * * * *